United States Patent
Naik et al.

(10) Patent No.: US 12,198,157 B2
(45) Date of Patent: Jan. 14, 2025

(54) TECHNIQUES FOR DYNAMICALLY AND SECURELY MANAGING USER REWARDS

(71) Applicant: Ally Financial Inc., Detroit, MI (US)

(72) Inventors: Harish Naik, Phoenix, AZ (US); Arvy Rajasekaran, Charlotte, NC (US); Dallas Gale, Phoenix, AZ (US); Dzmitry Dubarau, Charlotte, NC (US); Jared Allmond, Detroit, MI (US); Sathish Muthukrishnan, Charlotte, NC (US)

(73) Assignee: Ally Financial Inc., Detroit, MI (US)

( * ) Notice: Subject to any disclaimer, the term of this patent is extended or adjusted under 35 U.S.C. 154(b) by 0 days.

(21) Appl. No.: 18/153,632

(22) Filed: Jan. 12, 2023

(65) Prior Publication Data

US 2024/0242241 A1 Jul. 18, 2024

(51) Int. Cl.
*G06Q 30/00* (2023.01)
*G06Q 30/0207* (2023.01)

(52) U.S. Cl.
CPC ..... *G06Q 30/0224* (2013.01); *G06Q 30/0236* (2013.01); *G06Q 2220/00* (2013.01)

(58) Field of Classification Search
CPC .......... G06Q 30/0224; G06Q 30/0236; G06Q 2220/00
See application file for complete search history.

(56) References Cited

U.S. PATENT DOCUMENTS

| | | | | |
|---|---|---|---|---|
| 11,461,796 B1 * | 10/2022 | Donels | ............... | G06Q 30/0239 |
| 2014/0006135 A1 * | 1/2014 | Vergun | ............... | G06Q 30/0279 |
| | | | | 705/14.27 |
| 2020/0388363 A1 * | 12/2020 | Docktor | ................. | G16H 10/60 |
| 2022/0067740 A1 * | 3/2022 | Patel | ........................ | G06F 21/44 |
| 2022/0076289 A1 * | 3/2022 | Williams Tubay | .......................... | |
| | | | | G06Q 30/0239 |
| 2023/0070389 A1 * | 3/2023 | Madhusudhan | ..... | G06Q 10/083 |

(Continued)

FOREIGN PATENT DOCUMENTS

| | | | | | |
|---|---|---|---|---|---|
| WO | WO-2024063954 A1 * | 3/2024 | ............. | G06Q 20/02 |
| WO | WO-2024096863 A1 * | 5/2024 | ........... | G06F 21/105 |

OTHER PUBLICATIONS

Musiala,Robert A.,,Jr. (Jul. 26, 2022). Introduction to non-fungible tokens. Mondaq Business Briefing (Year: 2022).*

(Continued)

*Primary Examiner* — Matthew L Hamilton
(74) *Attorney, Agent, or Firm* — Holland & Hart LLP

(57) ABSTRACT

Methods, systems, and devices to support techniques for dynamically and securely managing user rewards are described. A system may issue digital assets that include a user-specific code to a user, and the system may store the digital assets on a distributed ledger (e.g., in a digital wallet associated with the user). The system may issue one or more digital assets to the user in response to determining that the user has performed one or more actions corresponding to the one or more digital assets. In some examples, each digital asset may include a same user-specific code, such as a quick response (QR) code, embedded in a respective image associated with each digital asset. The user may present an owned digital asset to a third-party vendor, and the third-party vendor may scan the user-specific code associated with the digital asset to identify and provide rewards available to the user.

18 Claims, 7 Drawing Sheets

(56) References Cited

U.S. PATENT DOCUMENTS

| | | | |
|---|---|---|---|
| 2023/0143854 A1* | 5/2023 | Venezia | H04L 9/0891 |
| | | | 705/65 |
| 2023/0245137 A1* | 8/2023 | McCullough | G06Q 30/0185 |
| | | | 705/318 |
| 2024/0005305 A1* | 1/2024 | Rush | G06Q 30/0242 |
| 2024/0005354 A1* | 1/2024 | Rush | G06Q 20/3672 |
| 2024/0221021 A1* | 7/2024 | Mancilla | G06Q 30/0226 |

OTHER PUBLICATIONS

Yuanjiang, Y., & Zhou, J. T. (2022). Ticketing system based on NFT (Year: 2022).*

* cited by examiner

TECHNIQUES FOR DYNAMICALLY AND SECURELY MANAGING USER REWARDS

FIELD OF TECHNOLOGY

The present disclosure relates generally to distributed systems and data processing, and more specifically to techniques for dynamically and securely managing user rewards.

BACKGROUND

Companies and organizations may provide a rewards platform to users to increase engagement between the user and organizations. For example, an organization may partner with one or more third party vendors to offer the user rewards for actions associated with the organization, for purchases or services rendered by organization and/or the third party vendors, or the like. In some cases, however, rewards may be provided to the user via relatively unsecured techniques, such as rewards voucher issued via email. Moreover, conventional rewards programs may issue monetary rewards in the form of physical gift cards, which may be subject to loss, theft, or may be misplaced or forgotten about, resulting in an inability by the user to redeem such rewards. As such, issuing, storing, and redeeming user rewards may be subject to unique security challenges.

SUMMARY

The described techniques relate to improved methods, systems, devices, and apparatuses that support techniques for dynamically and securely managing user rewards. Generally, the described techniques provide for issuing and storing secure digital assets that include an embedded code (e.g., a user-specific code), which may be scanned by one or more organizations to provide rewards and other benefits to an owner of the digital asset. For example, a system may issue digital assets that include a user-specific code to a user, and the system may store the digital assets on a distributed ledger (e.g., in a digital wallet associated with the user). The system may issue one or more digital assets to the user in response to determining that the user has performed one or more actions corresponding to the one or more digital assets. In some examples, each digital asset may include a same user-specific code, such as a quick response (QR) code, embedded in a respective image associated with each digital asset. The user may present an owned digital asset to a third-party vendor, and the third-party vendor may scan the user-specific code associated with the digital asset to identify and provide rewards available to the user.

A method is described. The method may include determining, by a system providing a distributed ledger, whether a user has performed one or more actions of a plurality of actions based at least in part on the user having one or more accounts provided by a first organization, the first organization being associated with the distributed ledger, generating a first digital asset comprising a user-specific code for the user based at least in part on determining that the user has performed a first action of the plurality of actions, storing a record of the first digital asset in the distributed ledger, wherein the first digital asset is made available to the user via a digital wallet based at least in part on the first digital asset being recorded in the distributed ledger, receiving, from a second organization, an application programming interface (API) call comprising an indication of the user and a request for access to one or more rewards in response to the user-specific code included in a digital asset being scanned by a device associated with the second organization, determining, by a rules engine of the system, whether the one or more rewards are available to the user based at least in part on the user performing the one or more actions, and transmitting, to the second organization in response to the API call, a message indicating that the user has access to the one or more rewards.

An apparatus is described. The apparatus may include a processor, memory coupled with the processor, and instructions stored in the memory. The instructions may be executable by the processor to cause the apparatus to determine, by a system providing a distributed ledger, whether a user has performed one or more actions of a plurality of actions based at least in part on the user having one or more accounts provided by a first organization, the first organization being associated with the distributed ledger, generate a first digital asset comprising a user-specific code for the user based at least in part on determining that the user has performed a first action of the plurality of actions, store a record of the first digital asset in the distributed ledger, wherein the first digital asset is made available to the user via a digital wallet based at least in part on the first digital asset being recorded in the distributed ledger, receive, from a second organization, an API call comprising an indication of the user and a request for access to one or more rewards in response to the user-specific code included in a digital asset being scanned by a device associated with the second organization, determine, by a rules engine of the system, whether the one or more rewards are available to the user based at least in part on the user performing the one or more actions, and transmit, to the second organization in response to the API call, a message indicating that the user has access to the one or more rewards.

Another apparatus is described. The apparatus may include means for determining, by a system providing a distributed ledger, whether a user has performed one or more actions of a plurality of actions based at least in part on the user having one or more accounts provided by a first organization, the first organization being associated with the distributed ledger, means for generating a first digital asset comprising a user-specific code for the user based at least in part on determining that the user has performed a first action of the plurality of actions, means for storing a record of the first digital asset in the distributed ledger, wherein the first digital asset is made available to the user via a digital wallet based at least in part on the first digital asset being recorded in the distributed ledger, means for receiving, from a second organization, an API call comprising an indication of the user and a request for access to one or more rewards in response to the user-specific code included in a digital asset being scanned by a device associated with the second organization, means for determining, by a rules engine of the system, whether the one or more rewards are available to the user based at least in part on the user performing the one or more actions, and means for transmitting, to the second organization in response to the API call, a message indicating that the user has access to the one or more rewards.

A non-transitory computer-readable medium storing code is described. The code may include instructions executable by a processor to determine, by a system providing a distributed ledger, whether a user has performed one or more actions of a plurality of actions based at least in part on the user having one or more accounts provided by a first organization, the first organization being associated with the distributed ledger, generate a first digital asset comprising a user-specific code for the user based at least in part on determining that the user has performed a first action of the plurality of actions, store a record of the first digital asset in the distributed ledger, wherein the first digital asset is made available to the user via a digital wallet based at least in part on the first digital asset being recorded in the distributed ledger, receive, from a second organization, an API call comprising an indication of the user and a request for access to one or more rewards in response to the user-specific code included in a digital asset being scanned by a device associated with the second organization, determine, by a rules engine of the system, whether the one or more rewards are available to the user based at least in part on the user performing the one or more actions, and transmit, to the second organization in response to the API call, a message indicating that the user has access to the one or more rewards.

Some examples of the method, apparatuses, and non-transitory computer-readable medium described herein may further include operations, features, means, or instructions for identifying, by the system, whether the user may have performed a second action of the plurality of actions, generating a second digital asset comprising the user-specific code, and storing a record of the second digital asset in the distributed ledger, wherein the second digital asset may be made available to the user via the digital wallet based at least in part on the second digital asset being recorded in the distributed ledger.

Some examples of the method, apparatuses, and non-transitory computer-readable medium described herein may further include operations, features, means, or instructions for generating the user-specific code based at least in part on performing a hashing function on an identifier associated with the user, wherein the user-specific code may be based at least in part on an output of the hashing function.

In some examples of the method, apparatuses, and non-transitory computer-readable medium described herein, the identifier associated with the user comprises a name associated with the user, an account number associated with the user, a date associated with the user, or a combination thereof.

Some examples of the method, apparatuses, and non-transitory computer-readable medium described herein may further include operations, features, means, or instructions for embedding the output of the hashing function in a quick response (QR) code, wherein the user-specific code comprises the QR code.

Some examples of the method, apparatuses, and non-transitory computer-readable medium described herein may further include operations, features, means, or instructions for receiving, from a third organization, a second API call comprising the indication of the user and the request for access to one or more rewards in response to the user-specific code being scanned by a device associated with the third organization, identifying one or more contents of the digital wallet based at least in part on querying the distributed ledger, and transmitting an acknowledgment to the third organization in response to the second API call and based at least in part on determining that the first digital asset may be included in the one or more contents of the digital wallet.

Some examples of the method, apparatuses, and non-transitory computer-readable medium described herein may further include operations, features, means, or instructions for receiving, from a third organization and after deactivating an account of the one or more accounts, a second API call comprising an indication of the user based at least in part on the digital asset, determining that the account of the user may be deactivated based at least in part on receiving the second API call, identifying, by the rules engine, one or more second rewards associated with the third organization for the user based at least in part on determining that the account of the user may be deactivated, and transmitting a message indicating the one or more second rewards to the third organization in response to the second API call.

In some examples of the method, apparatuses, and non-transitory computer-readable medium described herein, the digital asset comprises a non-fungible token (NFT) and an image associated with the NFT and the user-specific code may be embedded in the image.

In some examples of the method, apparatuses, and non-transitory computer-readable medium described herein, determining whether the one or more rewards may be available to the user may include operations, features, means, or instructions for determining, by the rules engine, whether a parameter of the one or more accounts satisfies a condition, wherein a reward of the one or more rewards may be based at least in part on the parameter satisfying the condition.

In some examples of the method, apparatuses, and non-transitory computer-readable medium described herein, the parameter comprises an account balance of the one or more accounts, an age of the one or more accounts, an indication of whether a second digital asset may be included in the digital wallet, and indication of whether the user may have performed a second action of the plurality of actions, or a combination thereof.

DETAILED DESCRIPTION

Figure 1:
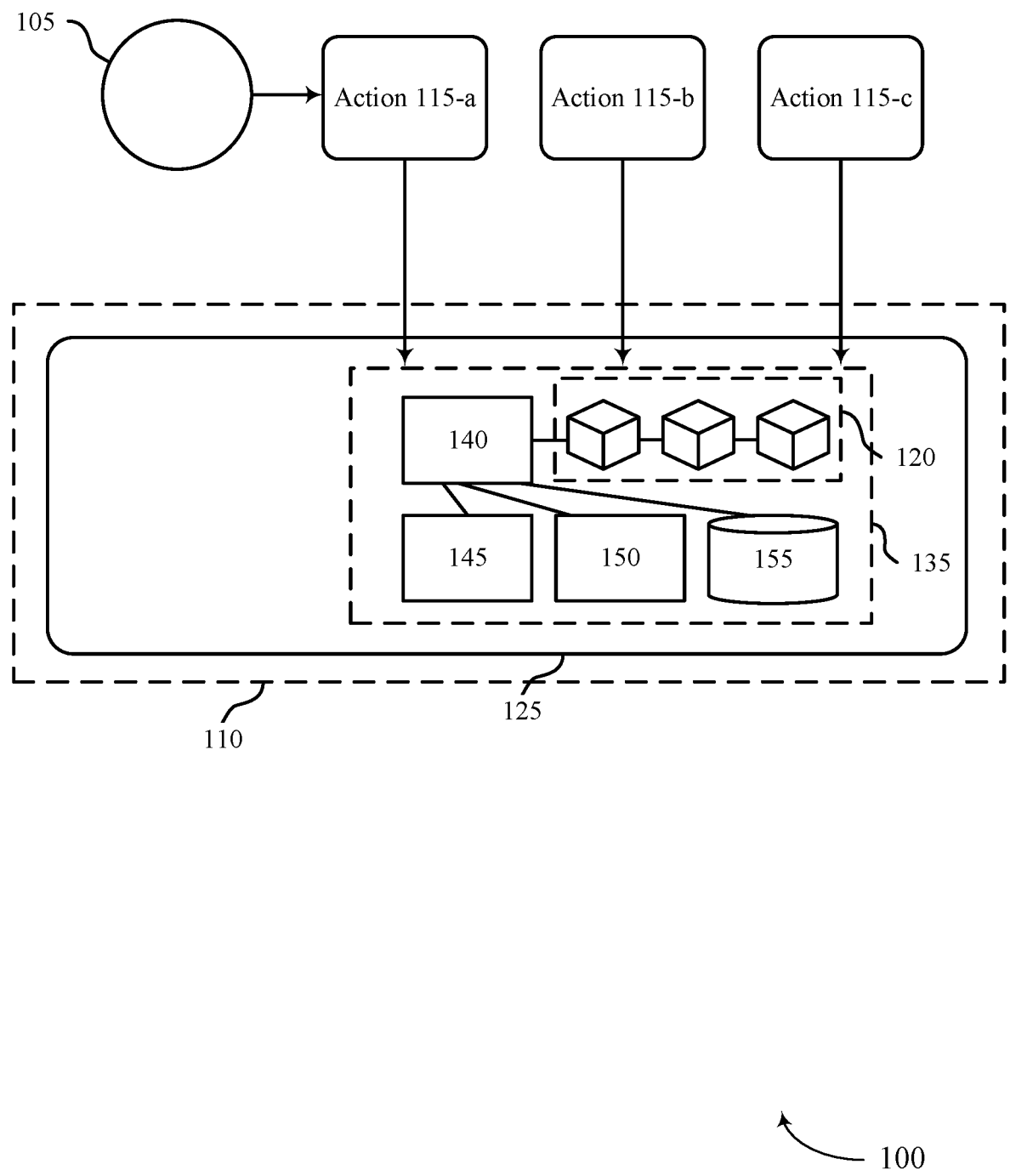
FIG. 1 illustrates an example of a system that supports techniques for dynamically and securely managing user rewards in accordance with one or more aspects of the present disclosure.

In some cases, a company or organization may offer and manage rewards for users (e.g., customers) who have an account with the organization. For example, the organization may partner with other organizations (e.g., third-party vendors that provide goods or services), such that if a user performs certain actions (e.g., uses a service provided by the organization, purchases a good or service from the third party), the user is issued rewards redeemable at one or more third party vendors, such as discounts, early access to merchandise or events, and so on. In some cases, the user may redeem the rewards for cash, goods, unique products, or services from the organization, or other rewards from third party vendors. However, interactions between an organization's rewards program and one or more third-party vendors in real-time may be introduce prohibitive delays for the transaction, may introduce security risks to the rewards program, or both. More specifically, tracking, validating, and managing rewards between organizations may be subject to relatively infrequent reporting methods and verification, which may be relatively inefficient and result in delays in rewards being issued to a user or redeemable by the user.

Moreover, some rewards issued to a user may be subject to unique security challenges. For example, a user may be issue with a reward voucher via relatively unsecured techniques, which may result in the earned rewards being lost or stolen. For example, a reward voucher issued to a customer via email may only be as secure as the user's email inbox. Moreover, issuing various rewards (or a relatively large quantity of rewards) to a user may introduce inefficiencies (to both a system managing rewards and to the user) in tracking and determining which rewards are available to the user, which rewards are valid, and so forth. In other examples, some customers may be susceptible to scams and attempts to defraud the customer received in the form alleged rewards programs (e.g., under the guise of an actual rewards program offered by the organization), which may be received by the customer using conventional delivery methods, such as email. Accordingly, techniques to securely and efficiently manage user rewards are desired.

As described herein, to mitigate delay between a user interaction with a third-party and an award or redemption of rewards, as well as enhancing the security associated with rewards issued to a user (e.g., a customer), a system (e.g., a system associated with an organization) may issue digital assets that include a user-specific code to a user. The system may store the digital assets on a distributed ledger (e.g., in a digital wallet associated with the user). The system may issue one or more digital assets to the user in response to determining that the user has performed one or more actions corresponding to the one or more digital assets. In some examples, each digital asset may include a common user-specific code, such as a quick-response (QR) code, embedded in a respective image associated with each digital asset. For instance, the digital asset may be an example of a unique cryptographic asset, such as a non-fungible token (NFT), that includes an embedded QR code, where a record of the NFT (e.g., identifiers, metadata) is stored on a distributed ledger. In such cases, the issuance of the digital asset to the user may be immediate (e.g., in response to the user performing one or more predefined actions), thereby decreasing an amount of time for the user to receive the reward. The user may present an owned digital asset to a third-party vendor partnered with the organization, and the third-party vendor may scan the digital asset to identify one or more rewards available to the user.

In such cases, the digital asset may be efficiently and immediately redeemable by the user (e.g., without the need for the organization or the vendor to validate transaction data to ensure the user has access to the reward), because a rules engine associated with the organization may determine which rewards the user is eligible for when the user-specific code is scanned. For example, upon scanning the user-specific code by a device associated with the third-party vendor, an application programming interface (API) call may be sent to the system associated with the organization. The system may receive the API call and determine, using the rules engine, which rewards are available to the user to be redeemed with the third-party. The system may then return an API call comprising an indication of one or more rewards available to the user (e.g., discounts, early access, additional products or services, or the like).

Aspects of the disclosure are initially described in the context of systems and a process flow with reference to FIGS. 1 through 5. Further examples are then provided that illustrate block diagrams and flow charts that support techniques for dynamically and securely managing user rewards with reference to FIGS. 6 and 7.

This description provides examples, and is not intended to limit the scope, applicability or configuration of the principles described herein. Rather, the ensuing description will provide those skilled in the art with an enabling description for implementing various aspects of the principles described herein. As can be understood by one skilled in the art, various changes may be made in the function and arrangement of elements without departing from the application.

It should be appreciated by a person skilled in the art that one or more aspects of the disclosure may be implemented in a system to additionally, or alternatively, solve other problems than those described herein. Further, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

FIG. 1 illustrates an example of a system 100 that supports techniques for dynamically and securely managing user rewards in accordance with one or more aspects of the present disclosure. The system 100 may include one or more users 105 which may interact (e.g., via one or more devices, applications, or the like) with one or more organizations 110 (e.g., companies, banks, corporations, credit unions, lenders) over a network, such as the Internet. Accordingly, each user 105 described herein may be associated with a device (e.g., a desktop computer, a laptop, a smartphone, a tablet, or other computing system). Similarly, the organization 110 described herein may be associated with one or more devices (e.g., computers, servers, databases, platforms, or the like).

To increase the engagement of the user 105 with the organization 110, the organization 110 may offer rewards to the user 105 for some actions 115, such as purchases or behaviors, opening an account with the organization, maintaining the account for a period of time, applying for a loan (e.g., mortgage, auto loan) with the organization 110, posting about the organization 110 on a social media site, or a combination thereof, among other examples. In some examples, the organization 110 may collaborate or partner with one or more vendors to provide rewards to the user 105. The user 105 may redeem any earned rewards with the organization 110 for goods and services, such as cash rewards, discounts for goods or services provided by partnered organizations, and so on.

The one or more vendors may be a third-party organization, such as a car dealership, a mortgage lender, a wealth advisor, or other vendor which has partnered with the organization 110. In some cases, as part of the partnership, the third-party organization may agree to provide rewards (e.g., reward points, discounts, early access, or the like) to the user 105 for at least some actions 115 performed by the user 105, such as making a purchase, attending a seminar, sharing social media posts, or other type of engagement with the organization 110, the third-party organization, or both. Additionally, or alternatively, the third-party organization may be associated with the organization 110 itself. For example, the representative may be a wealth advisor, a mortgage lender, or other employee or representative of the organization 110.

The organization 110 may manage a rewards platform for the user 105. For example, the organization 110, the user 105, or both may generate a profile or account on a platform 125 (e.g., a digital platform, a computing platform, an environment where software is executed) managed by the organization 110. In some aspects, the platform 125 may provide a deployment of one or more services. In some examples, the organization 110 may be a financial institution, and the user 105 may open a financial account (e.g., a checking account, a savings account, an investment account, or the like) with the organization 110. As part of creating the account, the organization 110 may generate a user-specific code (e.g., a unique number associated with the user 105) for the user 105. The user-specific code may correspond to an identifier associated with the user, such as a name of the user, an account number of the account of the user, a date associated with the user (e.g., a birthdate), or a combination thereof. In some examples, the user-specific code may be based on a numerical output of a hashing function performed on the identifier. Additionally, as part of creating the account, the organization 110 may create and provide a digital wallet to the user 105. The digital wallet may store a record of digital assets owned by the user 105, such as NFTs, digital currencies (e.g., cryptocurrencies), as well as rewards owned by the user 105.

To securely record and manage digital assets, the organization 110 may manage or provide in a distributed ledger 120 via one or more systems, databases, or the like. The distributed ledger 120 may be an example of a blockchain structure, which may maintain a decentralized record of transactions between users 105, the organization 110, the vendors, or a combination thereof. For example, if the organization 110 awards a digital asset to a user 105, the distributed ledger 120 may be updated (e.g., a block (e.g., including unique identifiers and metadata associated with the digital asset) may be added to the distributed ledger 120) to include a record of the transaction. The record may include information such as an identifier for the user 105, an identifier for the vendor, an indication of the digit asset, a record of previous interactions, or any combination thereof. In some examples, the distributed ledger 120 may include one or more channels. Each channel may be associated with a different organization (e.g., an organization different than the organization 110 managing the distributed ledger 120). Additionally, or alternatively, the distributed ledger 120 may be an example of a private distributed ledger of the organization 110.

The platform 125 may include or may be associated with an account management system 135. The account management system 135 may manage account information associated with the user 105, the organization 110, the third-party vendors, or a combination thereof. For example, the account management system 135 may include a database 155, which may store account information, rewards information, or both in one or more memory systems. The account management system 135 may include or may implement API functionality (e.g., via an API gateway) that supports APIs 140 to access (e.g., to add an entry to, to search for a transaction) the distributed ledger 120. The account management system 135 may include one or more additional APIs associated with rewards of the user 105, such as a deposits API 145, which may support API calls to deposit or redeem rewards of a digital wallet of the user 105. The account management system 135 may also include a mortgage API 150, which may access or maintain information associated with a home loan or other loan of the user 105. Each of the API 140, the deposits API 145, and the mortgage API 150 may communicate with components of (e.g., using API calls) or may be implemented by the account management system 135. In some aspects, the account management system 135 may be associated with one or more services, one or more applications, or any combination thereof.

The user 105, the vendor, and the organization 110 may enter into one or more agreements associated with earning and redeeming rewards. Accordingly, the account management system 135 may monitor actions 115 of the user 105 to determine whether an action 115 performed by the user 105 satisfies terms of the one or more agreements, and update the digital wallet accordingly. In some cases, the account management system 135 may implement dedicated software to perform the monitoring (e.g., may use a transaction protocol, such as a smart contract, to execute, control and document the interaction according to the terms of the agreement).

The organization 110 may maintain a database of one or more types of actions 115 and digital assets corresponding to each of the types of action 115. For example, the organization 110 may issue a first type of digital asset to the user 105 in response to a first type of action 115, such as initiating a mortgage application, may issue a second type of digital asset in response to a second type of action 115, and so on. Each digital asset owned by a user 105 may include an indication of the user-specific code of the user 105 (e.g., embedded within the respective digital assets). For example, the user-specific code may be incorporated with a type of digital asset as part of generating and issuing the digital asset to the digital wallet of the user 105.

In some examples, the organization 110 may determine whether the user 105 has performed an action 115-a, such as initiating a mortgage application, of a set of actions 115. In some cases, the set of action 115 may be dynamically configured or predetermined. If the user 105 has performed the action 115-a, the organization 110 may generate a digital wallet associated with the user 105 (e.g., if the organization has not already generated a digital wallet associated with the user 105), and provide access to the digital wallet to the user 105 (e.g., may provide a link to the digital wallet to the user 105). In some aspects, the digital wallet may provide a highly secure delivery method for the issuance of rewards to the user 105, which may accordingly mitigate vulnerability to scams and attempts to defraud the user 105 (e.g., because access to the digital wallet may be restricted (e.g., via a private distributed ledger), and the organization 110 may thus be the only entity capable of providing such rewards to the user 105 via the digital wallet). Additionally, the organization 110 may generate a digital asset for the user 105 corresponding to the action 115-a using the user-specific code associated with the user 105, and may issue the digital asset to the digit wallet of the user 105 using the distributed ledger 120.

The organization 110 may determine whether the user 105 has performed an action 115-b, such as completing the mortgage application initiated as part of the action 115-a, making regular payments on the mortgage or other account, opening an account with the organization 110 (e.g., checking account, savings account, auto loan account), or a combination thereof, of the plurality of actions 115. If the user 105 has performed the action 115-*b*, the organization 110 may generate a second digital asset for the user 105 corresponding to the action 115-*b* using the user-specific code, and may issue the second digital asset to the digit wallet of the user 105 using the distributed ledger 120.

In some examples, the user 105 or organization 110 may perform an action 115-*c* associated with transferring or deactivating an account of the user 105. For example, the organization 110 may sell the mortgage of user (e.g., to a separate organization), the user 105 may deactivate the account, or both. In such cases, the organization may maintain the digit wallet of the user on the distributed ledger 120. Accordingly, the user 105 may retain ownership of the digital wallet and ownership of digital assets within the digital wallet. The user 105 may continue to access the digital wallet, present digital assets of the digital wallet to third-party vendors to receive rewards and benefits from the organization 110, or both.

In some cases, the user 105 may perform additional actions 115 after the action 115-*c*, such as reactivating the account or initiating an additional application with the organization 110 (e.g., additional mortgage application, additional auto loan application). In such cases, the organization 110 may generate and award additional digital assets to the digital wallet of the user 105.

Figure 2:
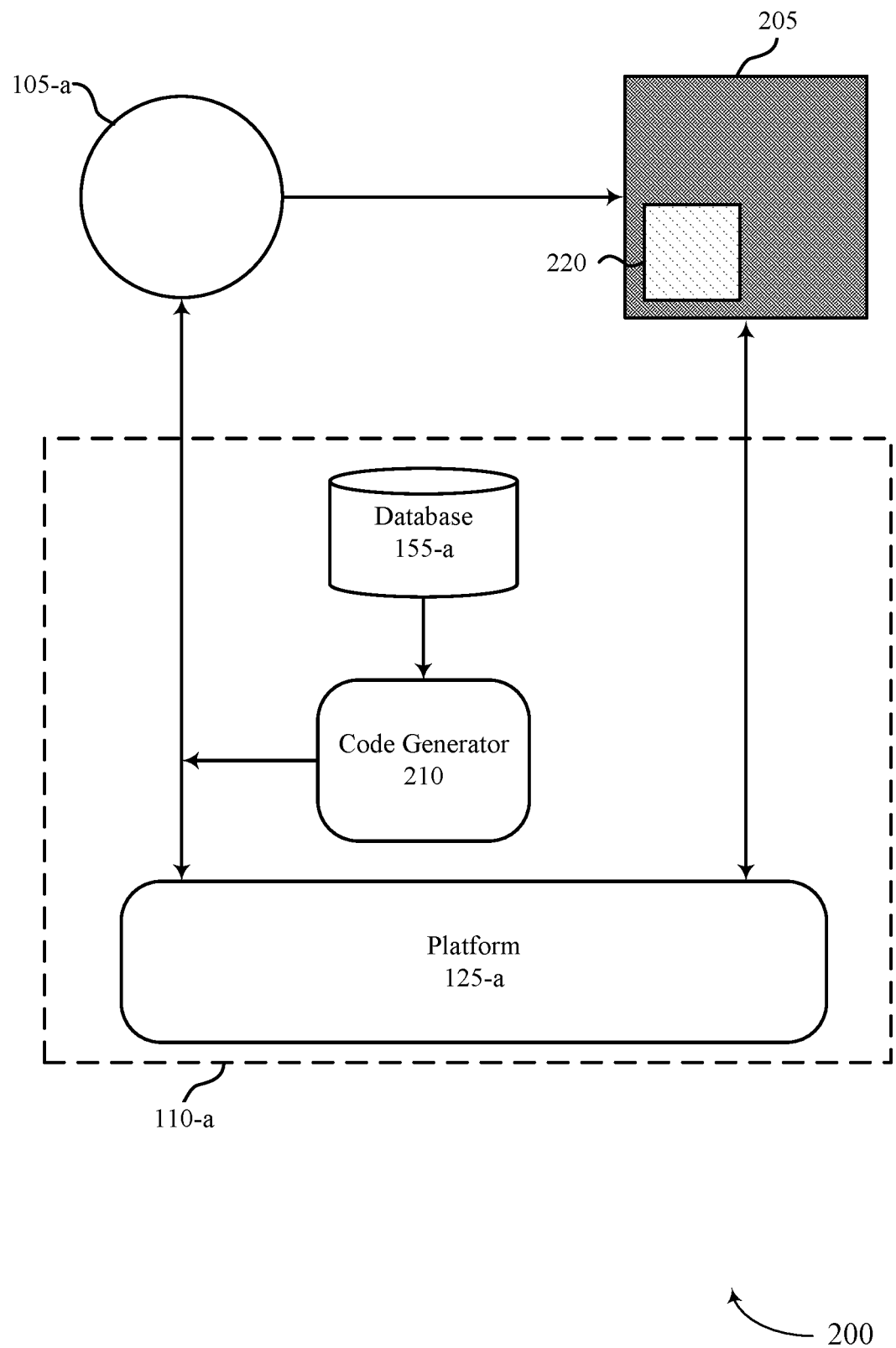
FIG. 2 illustrates an example of a system that supports techniques for dynamically and securely managing user rewards in accordance with one or more aspects of the present disclosure.

FIG. 2 illustrates an example of a system 200 that supports techniques for dynamically and securely managing user rewards in accordance with one or more aspects of the present disclosure. The system 200 may include a user 105-*a* and a platform 125-*a* (e.g., a digital platform, a computing platform, and environment where software is executed) of an organization 110-*a*, which may each be an example of the corresponding entities described with reference to FIG. 1. For example, the user 105-*a* may have an account with the organization 110-*a*, and the organization 110-*a* may manage a digital wallet storing digital assets for the user 105-*a*. The system 200 may support aspects of generating and issuing one or more digital assets to the user 105-*a*.

By way of example, the organization 110-*a* may determine whether the user 105-*a* has performed an action of a set of actions. In some cases, in response to determining that the user 105-*a* has performed the action (e.g., if the user 105-*a* is a new customer of the organization 110-*a*), the organization 110-*a* may identify an account for the user 105-*a*. As part of identifying the account, the organization 110-*a* may generate a user-specific code for the user 105 using the code generator 210.

The code generator 210 may generate the user-specific code using one or more identifiers, such as an account number of the account, a name of the user 105-*a*, a date associated with the user 105-*a* (e.g., a birthdate of the user 105-*a*), or a combination thereof. For example, the code generator 210 may perform a hashing function on the one or more identifiers to generate an output (e.g., a hash) corresponding to the user-specific code. In some examples, the organization 110-*a* may store the one or more identifiers in a database 155-*a*, and the code generator 210 may retrieve the one or more identifiers from the database 155-*a* as part of generating the user-specific code.

In some cases, the code generator 210 may further generate a scannable code 220 corresponding to the user-specific code. For example, the code generator 210 may generate the scannable code 220 using the output of the hashing function. In some cases, the scannable code 220 may be an example of a matrix barcode, or a QR code, or the like. Accordingly, as part of generating the QR code, the code generator may embed the output of the hashing function within the QR code. In some examples, the scannable code 220 may be scanned (e.g., by a third-party vendor), which may transmit an API call that includes an indication of the scannable code 220 to the platform 125-*a*. The platform 125-*a* may receive the API call, and may return an indication of one or more rewards available to the user 105-*a* as a response to the API call.

Additionally, in response to determining that the user 105-*a* has performed the action, the organization 110-*a* may generate a digital asset for the user 105-*a*. To generate the digital asset, the platform 125-*a* may obtain an image 205 (e.g., a unique image, a customized image) associated with the with the action (e.g., using a mapping between types of actions and types of digital assets). In some examples, the organization 110-*a* may store the image 205 and associated mapping in the database 155-*a*. Accordingly, the platform 125-*a* may retrieve the image 205 from the database 155-*a*. To associate the image 205 with the user 105-*a*, the platform 125-*a* may embed the scannable code 220 within the image 205 (e.g., the image 205 may include an embedded QR code based on the user-specific code). Accordingly, the image 205 may be unique to the user 105-*a*, and the account of the user 105-*a*, as well as rewards available to the user 105-*a* may be identified by scanning the scannable code 220 embedded within the image 205.

The organization 110-*a* may associate the image 205 (e.g., including the embedded scannable code 220) with the digital asset. For example, the digital asset may include the image 205, an indication that the user 105-*a* owns the digital asset, an indication of the action, or a combination thereof. The organization 110-*a* may store a record of the digital asset on a distributed ledger (e.g., a distributed ledger 120), and may issue the digital asset to the digital wallet of the user 105-*a*.

The organization 110-*a* may use the scannable code 220 to generate additional digital assets for the user 105-*a*. For example, if the organization 110-*a* determines that the user 105-*a* has performed a second action of the set of actions, the platform 125-*a* may retrieve a second image 205, and may embed the scannable code 220 in the second image 205. The organization 110-*a* may accordingly generate the digital asset using the second image 205 and the scannable code 220, and the organization 110-*a* may issue the second digital asset to the digital wallet of the user 105-*a*. Because the same scannable code 220 is embedded in the image 205 and the second image 205, a third-party vendor may use the digital asset, the second digital asset, or both to identify rewards available to the user 105-*a*.

Figure 3:
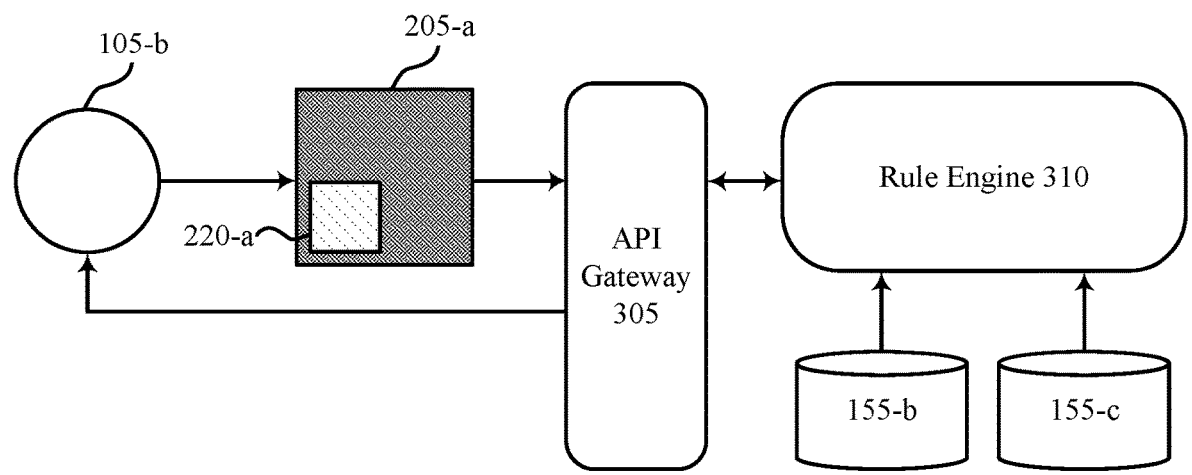
FIG. 3 illustrates an example of a system that supports techniques for dynamically and securely managing user rewards in accordance with one or more aspects of the present disclosure.

FIG. 3 illustrates an example of a system 300 that supports techniques for dynamically and securely managing user rewards in accordance with one or more aspects of the present disclosure. The system 300 may include a user 105-*b* and a platform 125-*b* of an organization, which may each be an example of the corresponding entities as described with reference to FIG. 1. For example, the user 105-*b* may have an account with the organization, and the organization may manage a digital wallet storing digital assets for the user 105-*b*. The system 300 may support aspects of a process to distribute rewards to the user 105-*b* using a digital asset owned by the user 105-*b*.

The organization may partner with a third-party vendor to provide rewards to the user 105-*b* based on one or more conditions stored in a rules engine 310. For example, the organization and the third-party vendor may agree to provide discounts, free merchandise, early access to merchandise or events, and so on, to the user 105-*b* if the user 105-*b* satisfies one or more conditions (e.g., one or more rules)

managed by the rules engine 310. Such conditions may include a threshold account balance with the organization, a threshold account age, whether the user 105-*b* has posted about the organization or third-party vendor on a social media site, among other examples.

As part of an event or transaction (e.g., a live convert, a purchase) associated with the third-party vendor, the user 105-*b*, the third-party vendor, or both may scan an image 205-*a* containing a scannable code 220-*a* associated with a digital asset owned by the user 105-*b* (e.g., a digital asset stored in a digital wallet of the user 105-*a*). As described in greater detail with reference to FIG. 2, the scannable code may include an embedding of the user-specific code associated with the user 105-*b*. Thus, scanning the scannable code 220-*a* may generate the user-specific code. Additionally, scanning the image 205-*a* may generate and transmit a message, such as an API call, to an API gateway 305 associated with the organization. In some examples, the API call may include information associated with the user 105-*b*, the third-party partner, the event or transaction, or a combination thereof, such as included in the following example API call:

```
getCustomerRewards
post
{
Hashkey (sha-256): "64 chars",
event: "location",
partner id: "partner-123";
}
```

In this example, the API call may include the user-specific code (e.g., hashkey) obtained by scanning the scannable code 220-*a*, and indication of the event, and an identifier of the third-party vendor (e.g., partner id).

The API gateway 305 may receive the API call, and may decrypt the user-specific code to identify the user 105-*b*. The API gateway 305 may query the rules engine 310 to identify one or more rewards available to the user 105-*b*. The rules engine 310 may retrieve information associated with the user 105-*b* from an internal database 155-*b*, such as an account balance, an account age, a type of loan associated with the user 105-*b*, transaction history of the user 105-*b*, behavior of the user 105-*b*, actions of the user 105-*b*, or a combination thereof. Additionally, or alternatively, the rules engine 310 may retrieve information associated with the user 105-*b* from an external database 155-*c*, such as activity on social media sites (e.g., posts, location check-ins).

The rules engine 310 may use the retrieved information to determine whether the user 105-*b* satisfies one or more conditions, and the rules engine 310 may transmit an indication of one or more rewards corresponding to the one or more conditions to the API gateway 305. In some examples, the organization may periodically update the rules engine 310. For example, the organization may add additional rewards to encourage certain behavior of a user 105, or may update or modify reward values or rewards conditions, or both. In some examples, the rules engine 310 may be stored, managed, or both using the distributed ledger. Accordingly, retrieving rewards using the rules engine 310 may be performed relatively faster, compared with other reward storage implementations. Additionally, using the distributed ledger may inherently improve security of the rewards, security of digital wallets of users, or both. In particular, the information regarding the digital assets held by the user 105-*b*, as well as the contents of the digital wallet associated with the user 105-*b*, may be stored on the distributed ledger, which may provide enhanced security (e.g., because the distributed ledger may use cryptography, employ hashing algorithms, have public/private keypairs, or the like).

The API gateway 305 may generate and transmit a response to the API call to the user 105-*b* or third-vendor indicating the one or more rewards. In some examples, the API response may include information associated with the user 105-*b*, the third-party partner, the rewards, or a combination thereof, such as included in the following example API response:

```
getCustomerRewards
Response
{
Hashkey (sha-256): "64 chars",
reward: "value",
partner id: "partner-123";
}
```

In this example, the API response may include the user-specific code (e.g., hashkey) associated with the user 105-*b*, and indication of the one or more rewards (e.g., a percentage discount, a cash reward), and an identifier of the third-party vendor (e.g., partner id). The user 105-*b* or third-party vendor may receive the API response, and the third-party vendor may award the one or more rewards to the user 105-*b*.

Figure 4:
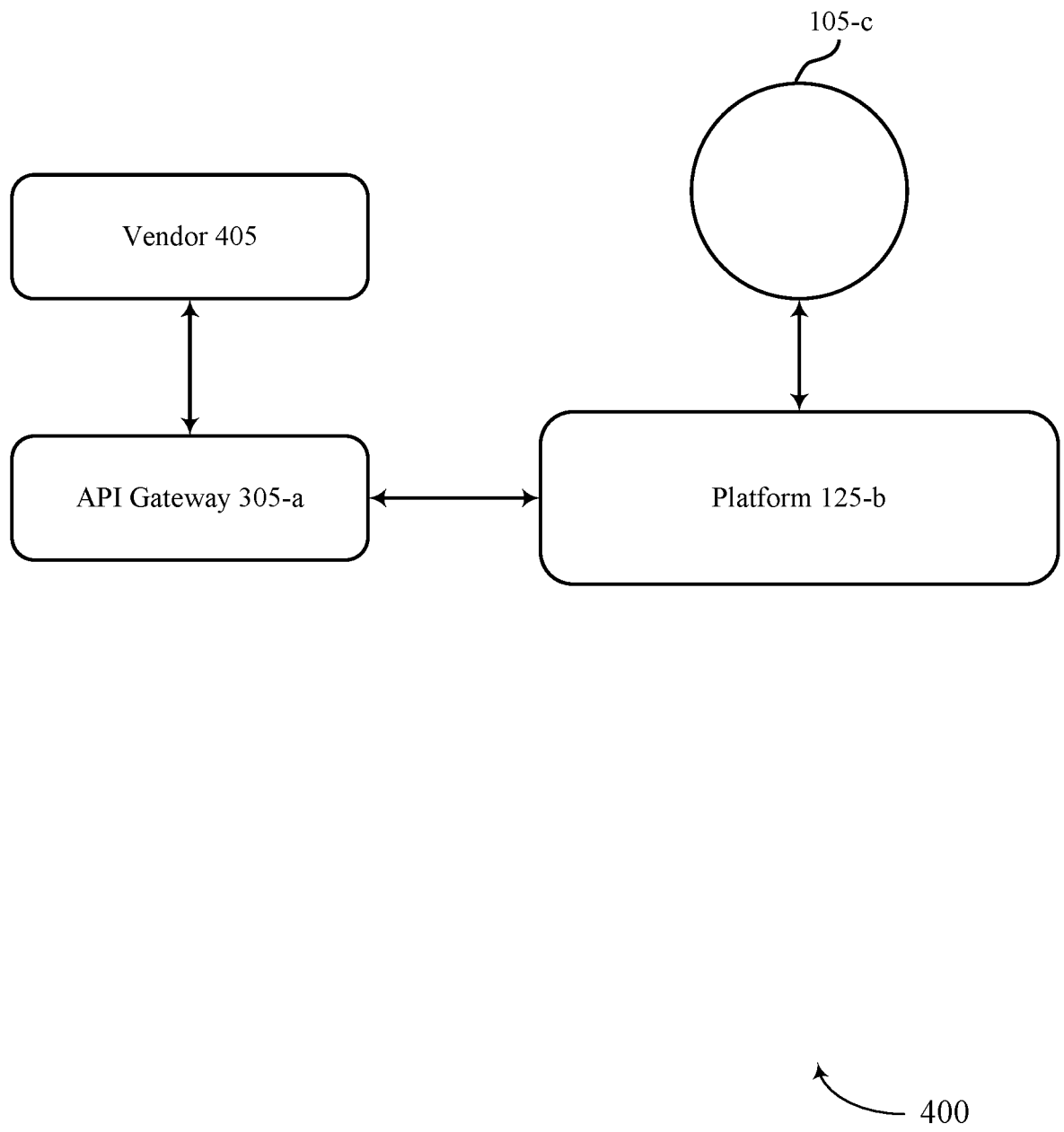
FIG. 4 illustrates an example of a system that supports techniques for dynamically and securely managing user rewards in accordance with one or more aspects of the present disclosure.

FIG. 4 illustrates an example of a system 400 that supports techniques for dynamically and securely managing user rewards in accordance with one or more aspects of the present disclosure. The system 400 may include a user 105-*c*, a platform 125-*c* of an organization, and an API gateway 305-*a* of the organization, which may each be an example of the corresponding entities as described with reference to FIGS. 1, 2, and 3. Additionally, the system 400 may include a third-party vendor 405 partnered with the organization. The system 400 may support aspects of a process to distribute rewards to the user 105-*c* based on ownership of a digit asset.

By way of example, as part of an event managed by the vendor 405, the organization, or both, the organization and the vendor 405 may agree to provide discounts, free merchandise, early access the event, and so on to the user 105-*c* if the user 105-*c* owns a particular type of digital asset (e.g., if the type of digital asset is present in the digital wallet of the user 105-*c*). Accordingly, the organization and the vendor 405 may reward the user 105-*c* for performing a type of action corresponding to the type of digital asset. For example, the organization and vendor 405 may reward a first user 105 with discounted access to the event if the first user 105 owns a first type of digital asset corresponding to a first action, such as initiating a mortgage application. Alternatively, the organization and vendor 405 may reward a second user 105 with free access to the event if the second user 105 owns a second type of digital asset corresponding to a second action, such as completing a mortgage application.

As part of the event, the user 105-*c*, the vendor 405, or both may scan an image containing a scannable code (e.g., a QR code) associated with a digital asset owned by the user 105-*c*. As described in greater detail with reference to FIG. 2, the scannable code may include an embedding of the user-specific code associated with the user 105-*c*. Thus, scanning the scannable code may identify the user-specific code and related information associated with the user. Additionally, scanning the scannable code may generate and transmit a message, such as an API call, to an API gateway 305-*a* associated with the organization. In some examples, the API call may include information associated with the user 105-*c*, the third-party partner, the event or transaction, or a combination thereof, such as the following example API call:

```
getCustomerRewards
post
{
Hashkey (sha-256): "64 chars",
event: "location",
NFT: "NFTname",
partner id: "partner-123";
}
```

In this example, the API call may include the user-specific code (e.g., hashkey) obtained by scanning the scannable code, and indication of the event, and indication of a type of digital asset used to qualify for a reward (e.g., NFT), and an identifier of the third-party vendor (e.g., partner id).

The API gateway 305-*a* may receive the API call, and may query the platform 125-*b* to identify one or more types of digital assets owned by the user 105-*c*. The platform 125-*b* may scan the digital wallet of the user 105-*c*, for example by querying the distributed ledger, to determine whether the type of digital asset indicated by the API call is present in the digital wallet of the user 105-*c*.

The platform 125-*b* may generate an indication of whether the indicated type of digital asset is present in the digital wallet of the user 105-*c*. In some examples, the organization may periodically update the rules engine 310. For example, the organization may add additional rewards to encourage certain behavior of a user 105, may update or modify reward values or rewards conditions, or both. The API gateway 305 may generate and transmit a response for the API call to the vendor 405 which includes the indication. In some examples, the API response may include information associated with the user 105-*c*, the vendor 405, the rewards, or a combination thereof, such as the following example API response:

```
getCustomerRewards
Response
{
NFTinWallet: "yes/no",
partner id: "partner-123";
}
```

In this example, the API response may include an indication of whether the indicated type of digital asset is present in the digital wallet of the user 105-*c*, and an identifier of the third-party vendor (e.g., partner id). The vendor 405 may receive the API response, and, if the type of digital asset is present, may award the user 105-*c* with the associated reward.

Figure 5:
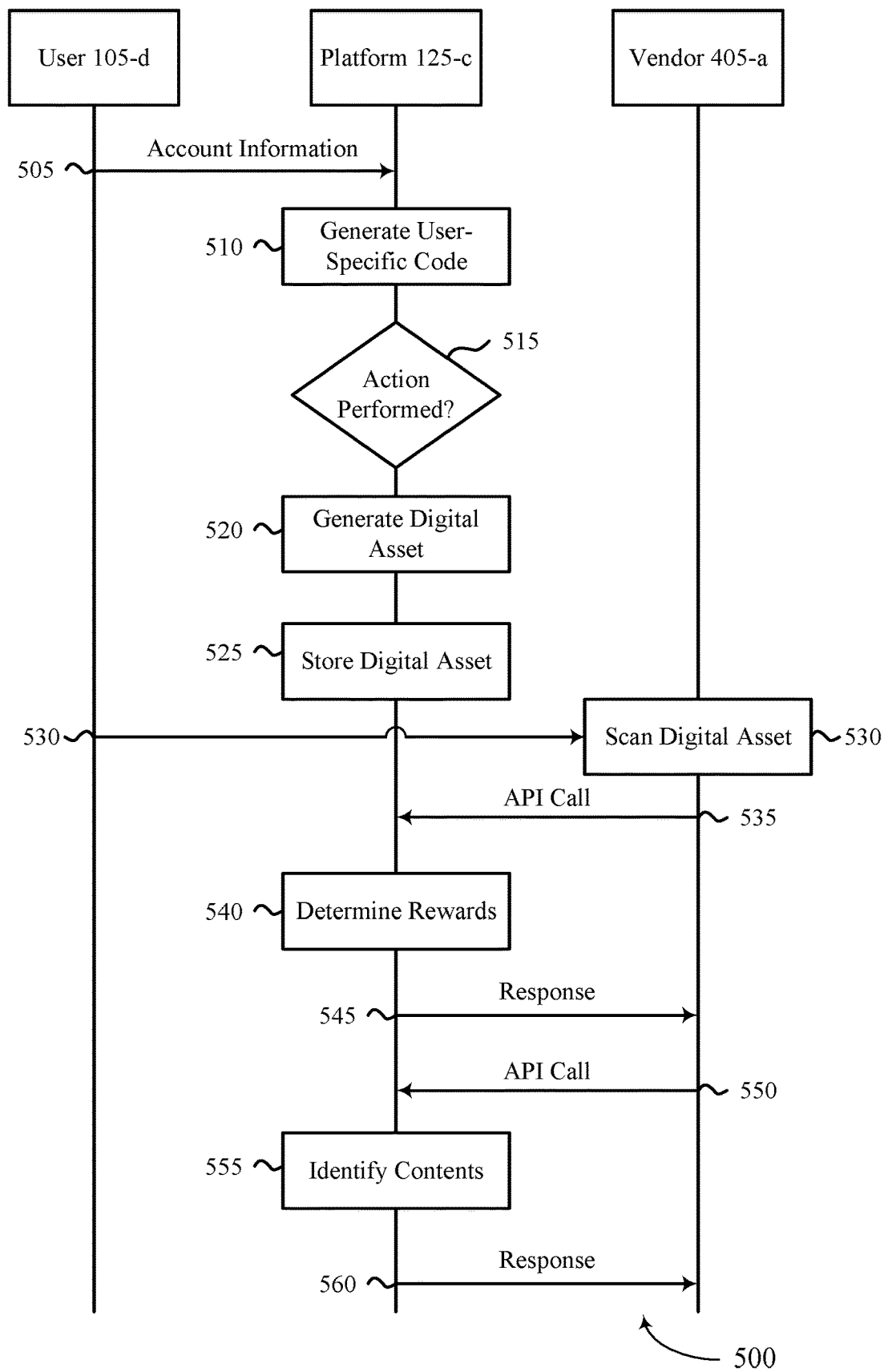
FIG. 5 illustrates an example of a process flow that supports techniques for dynamically and securely managing user rewards in accordance with one or more aspects of the present disclosure.

FIG. 5 illustrates an example of a process flow 500 that supports techniques for dynamically and securely managing user rewards in accordance with one or more aspects of the present disclosure. The process flow 500 or aspects thereof may be implemented by a user 105-*d* (e.g., via a user device, such as a mobile device), a platform 125-*c* (e.g., a system) of an organization which provides a distributed ledger, and a vendor 405-*a* (e.g., a vendor device), which may each be examples of the corresponding entities and devices described with reference to FIGS. 1 through 4. In the following description of the process flow 500, the operations may be performed in a different order than the order shown. For example, specific operations may also be left out of the process flow 500, or other operations may be added to process flow 500.

The process flow 500 may illustrate a method to issue digital assets to the user 105-*d*, and provide rewards to the user 105-*d*. For example, at 505, the user 105-*d* may provide account information to the organization (e.g., via a device transmitting signaling to the platform 125-*c*). The account information may be provided as part of performing an action of a set of actions (e.g., initiating a loan application, opening an account, or the like). In other example, the account information may be obtained by the organization based on one or more identifiers associated with the user 105-*d*.

At 510, the platform 125-*c* may generate a user-specific code for the user 105-*c*, for example, using the account information received at 505. In some examples, to generate the user-specific code, the platform 125-*c* may perform a hashing function (e.g., a secure hashing algorithm (SHA), such as SHA 256) on one or more identifiers of the user 105-*d* to generate an output, which may correspond to the user specific-code. The one or more identifiers may include aspects of the account information, such as a name associated with the user 105-*d*, an account number associated with the user 105-*d*, a date associated with the user 105-*d* (e.g., a birthdate), or a combination thereof. In some cases, the platform 125-*c* may generate a scannable code corresponding to the user-specific code.

At 515, the platform 125-*c* may determine whether the user 105-*d* has performed one or more actions of a set of actions (e.g., predefined actions). For each action of the one or more actions performed by the user 105-*d*, the platform 125-*c* may generate a respective digital asset. For example, at 520, the platform 125-*c* may generate a first digital asset corresponding to a first action of the one or more actions performed by the user 105-*d*, generate a second digital asset corresponding to a second action of the one or more actions performed by the user 105-*d*, or both.

Both the first digital asset and the second digital asset may include an indication of or display the user-specific code generated at 510. For example, each digital asset may be an example of a respective NFT and a respective image associated with the NFT, where the image may include the scannable code (e.g., the user-specific code). To generate the first digital asset, the platform 125-*c* may embed the user-specific code (e.g., may embed the QR code corresponding to the user-specific code) in a first image associated with the first digital asset. To generate the second digital asset, the platform 125-*c* may embed the same user-specific code in a second image associated with the second digital asset. As such, each digital asset generated by the platform 125-*c* may include a common user-specific code that is unique to the user 105-*d*.

At 525, the platform 125-*c* may store a record of the first digital asset, the second digital asset, or both in the distributed ledger. For example, the platform 125-*c* may add one or more blocks or records to the distributed ledger indicating that the first digital asset, the second digital asset, or both are owned by the user 105-*d*. In some cases, the platform 125-*c* may maintain a digital wallet on the distributed ledger for the user 105-*d* which stores an indication, such as a respective image, of the first digital asset, the second digital asset, or both. As part of storing the record, the platform 125-*c* may provide access to the digital wallet to the user 105-*d*. For example, the platform 125-*c* may transmit a hyperlink to the user 105-*d*, and the user 105-*d* may use the hyperlink to access and view contents of the digital wallet. In some cases, an application may notify the user that the digital asset is available (or has been added to) the digital wallet.

At 530, the user 105-*d* may provide (e.g., using a device, such as a smartphone, tablet, or the like) the digital asset to the vendor 405 to redeem rewards associated with the digital asset, where the vendor may scan the user-specific code embedded within the digital asset (e.g., using another device). In particular, the user 105-*d* may access the digital wallet that includes one or more of the digital assets, for example, using an application running on a mobile device, which may enable the user 105-*d* to display the digital asset to the vendor 405 (e.g., when purchasing a product, when gaining admission to an event, or the like). The vendor 405 may use a device to scan the embedded user-specific code of the digital asset when presented. Based on scanning the digital asset, the vendor 405-*a* may generate an API call that for transmission to the platform 125-*c*.

At 535, the vendor 405-*a* may transmit, and the platform 125-*c* may receive, the API call, where the API call includes an indication of the user 105-*d* and a request for access to one or more rewards from the vendor 405-*a*. In some cases, the vendor 405-*a* may transmit the API call in response to a device scanning an image associated with a digital asset owned by the user 105-*d* (e.g., as part of a transaction between the user 105-*d* and the vendor 405-*a*), for example, at 530.

At 540, in response to the API call, the platform 125-*c* may determine, using a rules engine, whether one or more rewards are available to the user 105-*d*. For example, the platform 125-*c* may determine whether a parameter of one or more accounts of the user 105-*d* satisfies a condition. If the parameter satisfies the condition, the platform 125-*c* may determine that a reward corresponding to the condition is available to the user 105-*d*. In some cases, the parameter may include an account balance of the one or more accounts of the user 105-*d*, an age of the one or more accounts, an indication of whether a particular digital asset is included in the digital wallet of the user 105-*d*, and indication of whether the user 105-*d* has performed a particular action, or a combination thereof. Accordingly, at 545, the platform 125-*c* may transmit a response to the API call to the vendor 405-*a* indicating the one or more rewards.

In some examples, the account of the user 105-*d* may have been deactivated prior to the vendor 405-*a* scanning the digital asset at 530. In such cases, the platform 125-*c* may still provide the one or more rewards, or additional rewards, to the user 105-*d*. For example, as part of responding to the API call, the platform 125-*c* may determine that the account of the user 105-*d* is deactivated. The platform 125-*c* may identify rewards available to the user 105-*d* (e.g., rewards earned prior to the account being deactivated), and the platform 125-*c* may transmit an indication of the rewards to the vendor 405-*a* as part of the response to the API call. As such, the user 105-*d* may have access to a secure digital wallet and the corresponding digital assets provided by an organization, even after the user 105-*d* is no longer a customer of the organization.

At 550, the platform 125-*c* may optionally receive a second API call which includes an indication of the user 105-*d* and a request for access to one or more rewards from the vendor 405-*a*. In some cases, the vendor 405-*a* may transmit the second API call as part of a device scanning an image associated with a digital asset owned by the user 105-*d* (e.g., as part of a transaction between the user 105-*d* and the vendor 405-*a*). The second API call may include an indication of a type of digital asset (e.g., a type or class of image associated with a particular digital asset), and may request a message indicating whether the type of digital asset is present in the digital wallet of the user 105-*d*.

At 555, the platform 125-*c* may identify one or more contents of the digital wallet of the user 105-*d*. If the one or more contents includes the type of digital asset indicated by the second API call (and corresponding rewards), the platform 125-*c* may, at 560, transmit an acknowledgment to the vendor 405-*a* that the digital wallet contains the indicated digital asset as a response to the API call. Alternatively, if the one or more contents does not include the type of digital asset indicated by the second API call (and corresponding rewards), the platform 125-*c* may transmit an indication that the digital wallet does not contain the indicated digital asset to the vendor 405-*a* as a response to the API call.

Figure 6:
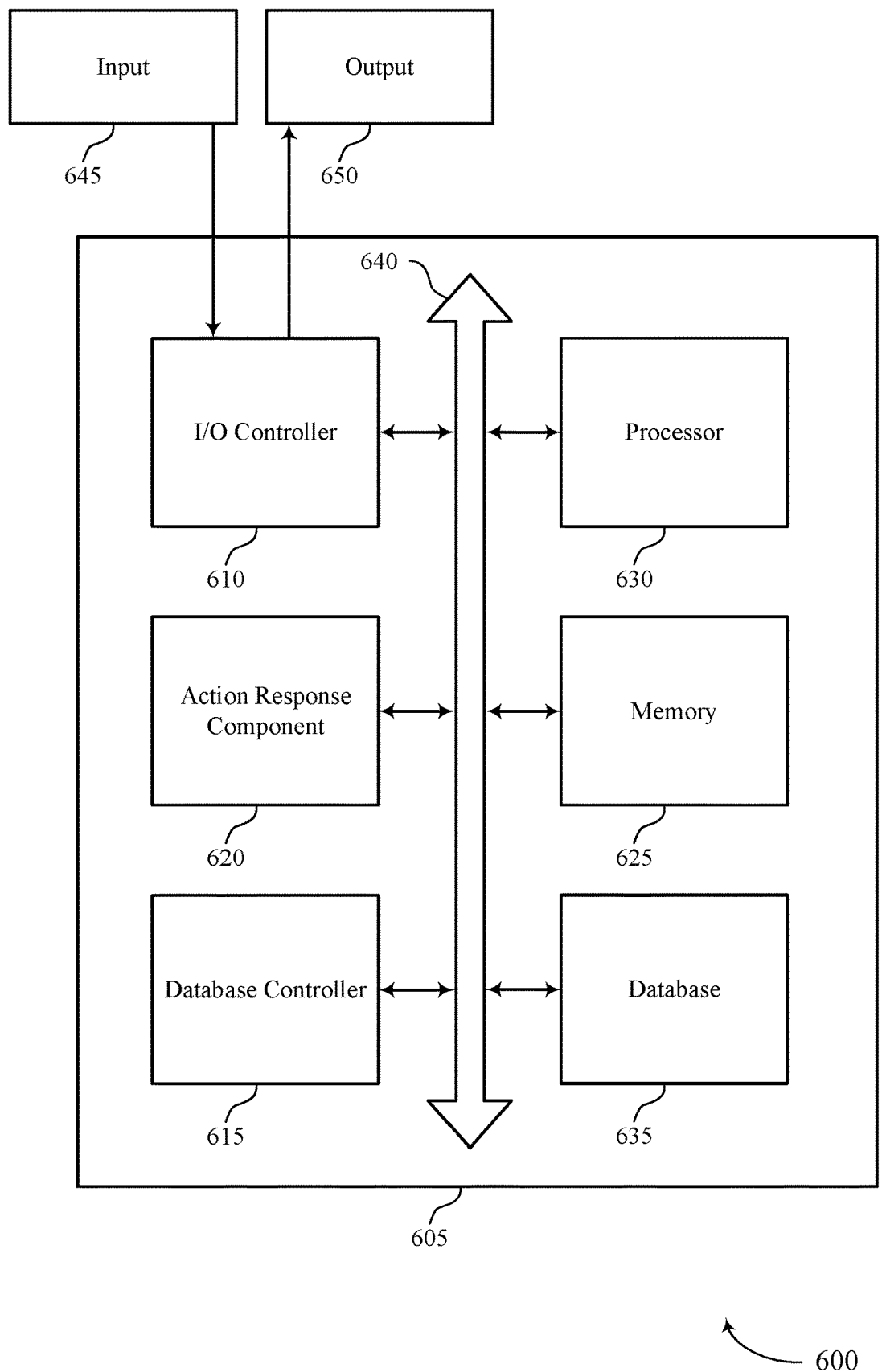
FIG. 6 illustrates a diagram of a system including a device that supports techniques for dynamically and securely managing user rewards in accordance with one or more aspects of the present disclosure.

FIG. 6 illustrates a diagram of a system 600 including a device 605 that supports techniques for dynamically and securely managing user rewards in accordance with one or more aspects of the present disclosure. The device 605 may include components for bi-directional voice and data communications including components for transmitting and receiving communications, such as an action response component 620, an input/output (I/O) controller 610, a database controller 615, a memory 625, a processor 630, and a database 635. These components may be in electronic communication or otherwise coupled (e.g., operatively, communicatively, functionally, electronically, electrically) via one or more buses (e.g., a bus 640).

The I/O controller 610 may manage input signals 645 and output signals 650 for the device 605. The I/O controller 610 may also manage peripherals not integrated into the device 605. In some cases, the I/O controller 610 may represent a physical connection or port to an external peripheral. In some cases, the I/O controller 610 may utilize an operating system such as iOS®, ANDROID®, MS-DOS®, MS-WINDOWS®, OS/2®, UNIX®, LINUX®, or another known operating system. Additionally, or alternatively, the I/O controller 610 may represent or interact with a modem, a keyboard, a mouse, a touchscreen, or a similar device. In some cases, the I/O controller 610 may be implemented as part of a processor. In some examples, a user may interact with the device 605 via the I/O controller 610 or via hardware components controlled by the I/O controller 610.

The database controller 615 may manage data storage and processing in a database 635. The database 635 may be external to the device 605, temporarily or permanently connected to the device 605, or a data storage component of the device 605. In some cases, a user may interact with the database controller 615. In some other cases, the database controller 615 may operate automatically without user interaction. The database 635 may be an example of a persistent data store, a single database, a distributed database, multiple distributed databases, a database management system, or an emergency backup database.

Memory 625 may include random-access memory (RAM) and read only memory (ROM). The memory 625 may store computer-readable, computer-executable software including instructions that, when executed, cause the processor to perform various functions described herein. In some cases, the memory 625 may contain, among other things, a BIOS which may control basic hardware or software operation such as the interaction with peripheral components or devices.

The processor 630 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof).

In some cases, the processor 630 may be configured to operate a memory array using a memory controller. In some other cases, a memory controller may be integrated into the processor 630. The processor 630 may be configured to execute computer-readable instructions stored in memory 625 to perform various functions (e.g., functions or tasks supporting techniques for dynamically and securely managing user rewards).

For example, the action response component 620 may be configured as or otherwise support a means for determining, by a system providing a distributed ledger, whether a user has performed one or more actions of a plurality of actions based at least in part on the user having one or more accounts provided by a first organization, the first organization being associated with the distributed ledger. The action response component 620 may be configured as or otherwise support a means for generating a first digital asset comprising a user-specific code for the user based at least in part on determining that the user has performed a first action of the plurality of actions. The action response component 620 may be configured as or otherwise support a means for storing a record of the first digital asset in the distributed ledger, wherein the first digital asset is made available to the user via a digital wallet based at least in part on the first digital asset being recorded in the distributed ledger. The action response component 620 may be configured as or otherwise support a means for receiving, from a second organization, an API call comprising an indication of the user and a request for access to one or more rewards in response to the user-specific code included in a digital asset being scanned by a device associated with the second organization. The action response component 620 may be configured as or otherwise support a means for determining, by a rules engine of the system, whether the one or more rewards are available to the user based at least in part on the user performing the one or more actions. The action response component 620 may be configured as or otherwise support a means for transmitting, to the second organization in response to the API call, a message indicating that the user has access to the one or more rewards.

By including or configuring the action response component 620 in accordance with examples as described herein, the device 605 may support techniques for dynamically and securely managing user rewards.

Figure 7:
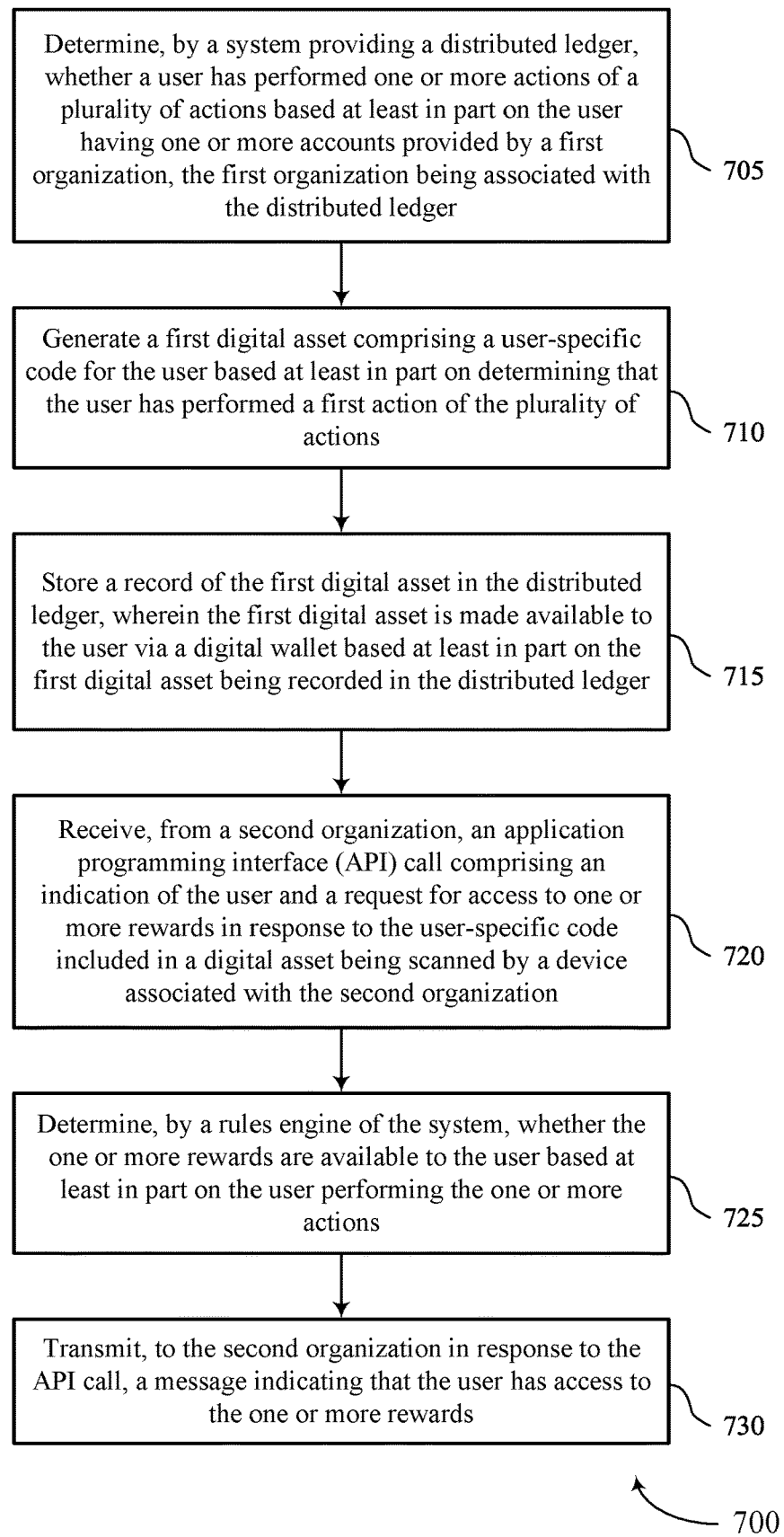
FIG. 7 illustrates a flowchart showing methods that support techniques for dynamically and securely managing user rewards in accordance with one or more aspects of the present disclosure.

FIG. 7 illustrates a flowchart showing a method 700 that supports techniques for dynamically and securely managing user rewards in accordance with one or more aspects of the present disclosure. The operations of the method 700 may be implemented by a distributed ledger system or its components as described herein. For example, the operations of the method 700 may be performed by a distributed ledger system as described with reference to FIGS. 1 through 6. In some examples, a distributed ledger system may execute a set of instructions to control the functional elements of the distributed ledger system to perform the described functions. Additionally, or alternatively, the distributed ledger system may perform aspects of the described functions using special-purpose hardware.

At 705, the method may include determining, by a system providing a distributed ledger, whether a user has performed one or more actions of a plurality of actions based at least in part on the user having one or more accounts provided by a first organization, the first organization being associated with the distributed ledger. The operations of 705 may be performed in accordance with examples as disclosed herein.

At 710, the method may include generating a first digital asset comprising a user-specific code for the user based at least in part on determining that the user has performed a first action of the plurality of actions. The operations of 710 may be performed in accordance with examples as disclosed herein.

At 715, the method may include storing a record of the first digital asset in the distributed ledger, wherein the first digital asset is made available to the user via a digital wallet based at least in part on the first digital asset being recorded in the distributed ledger. The operations of 715 may be performed in accordance with examples as disclosed herein.

At 720, the method may include receiving, from a second organization, an API call comprising an indication of the user and a request for access to one or more rewards in response to the user-specific code included in a digital asset being scanned by a device associated with the second organization. The operations of 720 may be performed in accordance with examples as disclosed herein.

At 725, the method may include determining, by a rules engine of the system, whether the one or more rewards are available to the user based at least in part on the user performing the one or more actions. The operations of 725 may be performed in accordance with examples as disclosed herein.

At 730, the method may include transmitting, to the second organization in response to the API call, a message indicating that the user has access to the one or more rewards. The operations of 730 may be performed in accordance with examples as disclosed herein.

In some examples, an apparatus as described herein may perform a method or methods, such as the method 700. The apparatus may include features, circuitry, logic, means, or instructions (e.g., a non-transitory computer-readable medium storing instructions executable by a processor) for determining, by a system providing a distributed ledger, whether a user has performed one or more actions of a plurality of actions based at least in part on the user having one or more accounts provided by a first organization, the first organization being associated with the distributed ledger, generating a first digital asset comprising a user-specific code for the user based at least in part on determining that the user has performed a first action of the plurality of actions, storing a record of the first digital asset in the distributed ledger, wherein the first digital asset is made available to the user via a digital wallet based at least in part on the first digital asset being recorded in the distributed ledger, receiving, from a second organization, an API call comprising an indication of the user and a request for access to one or more rewards in response to the user-specific code included in a digital asset being scanned by a device associated with the second organization, determining, by a rules engine of the system, whether the one or more rewards are available to the user based at least in part on the user performing the one or more actions, and transmitting, to the second organization in response to the API call, a message indicating that the user has access to the one or more rewards.

Some examples of the method 700 and the apparatus described herein may further include operations, features, means, or instructions for identifying, by the system, whether the user may have performed a second action of the plurality of actions, generating a second digital asset comprising the user-specific code, and storing a record of the second digital asset in the distributed ledger, wherein the second digital asset may be made available to the user via the digital wallet based at least in part on the second digital asset being recorded in the distributed ledger.

Some examples of the method 700 and the apparatus described herein may further include operations, features, means, or instructions for generating the user-specific code based at least in part on performing a hashing function on an identifier associated with the user, wherein the user-specific code may be based at least in part on an output of the hashing function.

In some examples of the method 700 and the apparatus described herein, the identifier associated with the user comprises a name associated with the user, an account number associated with the user, a date associated with the user, or a combination thereof.

Some examples of the method 700 and the apparatus described herein may further include operations, features, means, or instructions for embedding the output of the hashing function in a QR code, wherein the user-specific code comprises the QR code.

Some examples of the method 700 and the apparatus described herein may further include operations, features, means, or instructions for receiving, from a third organization, a second API call comprising the indication of the user and the request for access to one or more rewards in response to the user-specific code being scanned by a device associated with the third organization, identifying one or more contents of the digital wallet based at least in part on querying the distributed ledger, and transmitting an acknowledgment to the third organization in response to the second API call and based at least in part on determining that the first digital asset may be included in the one or more contents of the digital wallet.

Some examples of the method 700 and the apparatus described herein may further include operations, features, means, or instructions for receiving, from a third organization and after deactivating an account of the one or more accounts, a second API call comprising an indication of the user based at least in part on the digital asset, determining that the account of the user may be deactivated based at least in part on receiving the second API call, identifying, by the rules engine, one or more second rewards associated with the third organization for the user based at least in part on determining that the account of the user may be deactivated, and transmitting a message indicating the one or more second rewards to the third organization in response to the second API call.

In some examples of the method 700 and the apparatus described herein, the digital asset comprises an NFT and an image associated with the NFT and the user-specific code may be embedded in the image.

In some examples of the method 700 and the apparatus described herein, determining whether the one or more rewards may be available to the user may include operations, features, circuitry, logic, means, or instructions for determining, by the rules engine, whether a parameter of the one or more accounts satisfies a condition, wherein a reward of the one or more rewards may be based at least in part on the parameter satisfying the condition.

In some examples of the method 700 and the apparatus described herein, the parameter comprises an account balance of the one or more accounts, an age of the one or more accounts, an indication of whether a second digital asset may be included in the digital wallet, and indication of whether the user may have performed a second action of the plurality of actions, or a combination thereof.

It should be noted that these methods describe examples of implementations, and that the operations and the steps may be rearranged or otherwise modified such that other implementations are possible. In some examples, aspects from two or more of the methods may be combined. For example, aspects of each of the methods may include steps or aspects of the other methods, or other steps or techniques described herein. Thus, aspects of the disclosure may provide for consumer preference and maintenance interface.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

Information and signals described herein may be represented using any of a variety of different technologies and techniques. For example, data, instructions, commands, information, signals, bits, and symbols that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an ASIC, a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). The functions of each unit may also be implemented, in whole or in part, with instructions embodied in a memory, formatted to be executed by one or more general or application-specific processors.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method, comprising:
    determining, by a system providing a distributed ledger, whether a user has performed one or more actions of a plurality of actions based at least in part on the user having one or more accounts provided by a first organization, the first organization being associated with the distributed ledger;
    generating, by the system, a hash based at least in part on performing a hashing function on one or more identifiers associated with the user;
    embedding, by the system, the hash within a scannable code based at least in part on generating the hash;
    generating, by the system, a first digital asset for the user based at least in part on determining that the user has performed a first action of the plurality of actions, wherein the first digital asset is generated with the scannable code embedded into the first digital asset;
    storing, by the system, a record of the first digital asset in the distributed ledger, wherein the first digital asset is made available to the user via a digital wallet based at least in part on the first digital asset being recorded in the distributed ledger;
    receiving, by the system providing the distributed ledger and from a device associated with a second organization, an application programming interface (API) call comprising the hash and a request for access to one or more rewards in response to the scannable code included in the first digital asset being scanned by the device associated with the second organization from a user's device;
    determining, by a rules engine of the system, whether the one or more rewards are available to the user based at least in part on the user performing the one or more actions; and
    transmitting, to the second organization in response to the API call, a message indicating that the user has access to the one or more rewards.

2. The method of claim 1, further comprising:
    identifying, by the system, whether the user has performed a second action of the plurality of actions;
    generating a second digital asset comprising the scannable code; and
    storing a record of the second digital asset in the distributed ledger, wherein the second digital asset is made available to the user via the digital wallet based at least in part on the second digital asset being recorded in the distributed ledger.

3. The method of claim 1, wherein the one or more identifiers associated with the user comprise a name associated with the user, an account number associated with the user, a date associated with the user, or a combination thereof.

4. The method of claim 1, further comprising:
    embedding an output of the hashing function in a quick response (QR) code, wherein the scannable code comprises the QR code.

5. The method of claim 1, further comprising:
    receiving, from a third organization, a second API call comprising an indication of the user and the request for access to one or more rewards in response to the scannable code being scanned by a device associated with the third organization;
    identifying one or more contents of the digital wallet based at least in part on querying the distributed ledger; and
    transmitting an acknowledgment to the third organization in response to the second API call and based at least in part on determining that the first digital asset is included in the one or more contents of the digital wallet.

6. The method of claim 1, further comprising:
    receiving, from a third organization and after deactivating an account of the one or more accounts, a second API call comprising an indication of the user based at least in part on the first digital asset;
    determining that the account of the user is deactivated based at least in part on receiving the second API call;
    identifying, by the rules engine, one or more second rewards associated with the third organization for the user based at least in part on determining that the account of the user is deactivated; and transmitting a message indicating the one or more second rewards to the third organization in response to the second API call.

7. The method of claim 1, wherein the first digital asset comprises a non-fungible token (NFT) and an image associated with the NFT, and the scannable code is embedded in the image.

8. The method of claim 1, wherein determining whether the one or more rewards are available to the user comprises:
determining, by the rules engine, whether a parameter of the one or more accounts satisfies a condition, wherein a reward of the one or more rewards is based at least in part on the parameter satisfying the condition.

9. The method of claim 8, wherein the parameter comprises an account balance of the one or more accounts, an age of the one or more accounts, an indication of whether a second digital asset is included in the digital wallet, and indication of whether the user has performed a second action of the plurality of actions, or a combination thereof.

10. A non-transitory computer-readable medium storing code, the code comprising instructions executable by a processor to:
determine, by a system providing a distributed ledger, whether a user has performed one or more actions of a plurality of actions based at least in part on the user having one or more accounts provided by a first organization, the first organization being associated with the distributed ledger;
generate a hash based at least in part on performing a hashing function on one or more identifiers associated with the user;
embed the hash within a scannable code based at least in part on generating the hash;
generate a first digital asset for the user based at least in part on determining that the user has performed a first action of the plurality of actions, wherein the first digital asset is generated with the scannable code embedded into the first digital asset;
store a record of the first digital asset in the distributed ledger, wherein the first digital asset is made available to the user via a digital wallet based at least in part on the first digital asset being recorded in the distributed ledger;
receive, by the system providing the distributed ledger and from a device associated with a second organization, an application programming interface (API) call comprising the hash and a request for access to one or more rewards in response to the scannable code included in the first digital asset being scanned by the device associated with the second organization from a user's device;
determine, by a rules engine of the system, whether the one or more rewards are available to the user based at least in part on the user performing the one or more actions; and
transmit, to the second organization in response to the API call, a message indicating that the user has access to the one or more rewards.

11. The non-transitory computer-readable medium of claim 10, wherein the instructions are further executable by the processor to:
identify, by the system, whether the user has performed a second action of the plurality of actions;
generate a second digital asset comprising the scannable code; and
store a record of the second digital asset in the distributed ledger, wherein the second digital asset is made available to the user via the digital wallet based at least in part on the second digital asset being recorded in the distributed ledger.

12. The non-transitory computer-readable medium of claim 10, wherein the one or more identifiers associated with the user comprise a name associated with the user, an account number associated with the user, a date associated with the user, or a combination thereof.

13. The non-transitory computer-readable medium of claim 10, wherein the instructions are further executable by the processor to:
embed an output of the hashing function in a quick response (QR) code, wherein the scannable code comprises the QR code.

14. The non-transitory computer-readable medium of claim 10, wherein the instructions are further executable by the processor to:
receive, from a third organization, a second API call comprising an indication of the user and the request for access to one or more rewards in response to the scannable code being scanned by a device associated with the third organization;
identify one or more contents of the digital wallet based at least in part on querying the distributed ledger; and
transmit an acknowledgment to the third organization in response to the second API call and based at least in part on determining that the first digital asset is included in the one or more contents of the digital wallet.

15. The non-transitory computer-readable medium of claim 10, wherein the instructions are further executable by the processor to:
receive, from a third organization and after deactivating an account of the one or more accounts, a second API call comprising an indication of the user based at least in part on the first digital asset;
determine that the account of the user is deactivated based at least in part on receiving the second API call;
identify, by the rules engine, one or more second rewards associated with the third organization for the user based at least in part on determining that the account of the user is deactivated; and
transmit a message indicating the one or more second rewards to the third organization in response to the second API call.

16. The non-transitory computer-readable medium of claim 11, wherein the first digital asset comprises a non-fungible token (NFT) and an image associated with the NFT, and the scannable code is embedded in the image.

17. The non-transitory computer-readable medium of claim 10, wherein the instructions to determine whether the one or more rewards are available to the user are executable by the processor to:
determine, by the rules engine, whether a parameter of the one or more accounts satisfies a condition, wherein a reward of the one or more rewards is based at least in part on the parameter satisfying the condition.

18. An apparatus, comprising:
a controller associated with a memory device, wherein the controller is configured to cause the apparatus to:
determine, by a system providing a distributed ledger, whether a user has performed one or more actions of a plurality of actions based at least in part on the user having one or more accounts provided by a first organization, the first organization being associated with the distributed ledger;

generate a hash based at least in part on performing a hashing function on one or more identifiers associated with the user;

embed the hash within a scannable code based at least in part on generating the hash;

generate a first digital asset for the user based at least in part on determining that the user has performed a first action of the plurality of actions, wherein the first digital asset is generated with the scannable code embedded into the first digital asset;

store a record of the first digital asset in the distributed ledger, wherein the first digital asset is made available to the user via a digital wallet based at least in part on the first digital asset being recorded in the distributed ledger;

receive, by the system providing the distributed ledger and from a device associated with a second organization, an application programming interface (API) call comprising the hash and a request for access to one or more rewards in response to the scannable code included in the first digital asset being scanned by the device associated with the second organization from a user's device;

determine, by a rules engine of the system, whether the one or more rewards are available to the user based at least in part on the user performing the one or more actions; and transmit, to the second organization in response to the API call, a message indicating that the user has access to the one or more rewards.

\* \* \* \* \*